United States Patent [19]

Saliba

[11] Patent Number: 5,426,551

[45] Date of Patent: Jun. 20, 1995

[54] MAGNETIC CONTACT HEAD HAVING A COMPOSITE WEAR SURFACE

[75] Inventor: George A. Saliba, Northborough, Mass.

[73] Assignee: Quantum Corp., Milpitas, Calif.

[21] Appl. No.: 94,413

[22] Filed: Jul. 19, 1993

[51] Int. Cl.$^6$ .............................................. G11B 5/187
[52] U.S. Cl. ..................... 360/122; 360/125
[58] Field of Search .................. 360/113, 119–123, 360/125, 126

[56] References Cited

U.S. PATENT DOCUMENTS

| | | | |
|---|---|---|---|
| 4,300,179 | 11/1981 | Barnes et al. | 360/127 |
| 4,589,043 | 5/1986 | Grundtner | 360/121 |
| 4,686,596 | 8/1987 | Kraemer et al. | 360/126 |
| 4,695,909 | 8/1987 | Momata et al. | 360/122 |
| 4,697,217 | 9/1987 | Matsuura et al. | 360/125 |
| 4,706,146 | 11/1987 | Dohmen et al. | 360/122 |
| 4,809,110 | 2/1989 | Hertrich | 360/122 |
| 4,949,208 | 8/1990 | Milo et al. | 360/122 |
| 5,055,959 | 10/1991 | Saliba | 360/122 |
| 5,157,569 | 10/1992 | Kumasaka et al. | 360/126 |

OTHER PUBLICATIONS

Patent Abstracts of Japan, vol. 13, No. 35, (P-818) (3383) 26 Jan. 1989 & JP-A-63 231 707 (Hitachi Ltd.) abstract.
Patent Abstracts of Japan vol. 12, No. 138 (P-695) (2985) 27 Apr. 1988 & JP-A-62 259 208 (Nippon Ahoso Kyokai) abstract.
WO-A-8 906 420 (Eastman Kodak Co.) abstract; claims; figures. 7/89.

*Primary Examiner*—Stuart S. Levy
*Assistant Examiner*—Jefferson Evans
*Attorney, Agent, or Firm*—David B. Harrison

[57] ABSTRACT

A magnetic head and its manufacture where the head includes two spaced apart coplanar wear surfaces that are aligned along an axis in spaced apart relationship. Nonmagnetic material joins the two raised wear surfaces. A transducer is imbedded in the nonmagnetic material. And the transducer has an elongated surface of uniform width on one side that extends in a direction transverse to the raised wear surfaces. The elongated surface of the core and the surface of the magnetic material together form a composite wear surface that is generally coplanar with the raised wear surfaces. The area of the elongated surface of the magnetic core and the surface area of the nonmagnetic material are so proportioned that the wear of the composite wear surface is controlled by the nonmagnetic material. The hardness of the surface extending transversely of the raised elongated wear surfaces being selected to effect a predetermined wear between the composite surface and magnetic contact media and between the raised elongated wear surfaces and magnetic contact media.

12 Claims, 4 Drawing Sheets

MAGNETIC CONTACT HEAD HAVING A COMPOSITE WEAR SURFACE

BACKGROUND OF THE INVENTION

This invention relates to an improved magnetic tape head and its method of manufacture.

Magnetic tape heads typically have raised strips or ridges, commonly referred to as islands, that provide raised tape support or wear surfaces with embedded transducers across which magnetic tape advances. These embedded transducers can be either a recording element for writing information onto a magnetic tape or can be a reproducing element for reading information off a magnetic tape. An embedded recording element produces a magnetic field in the vicinity of a small gap in the core of the element, which causes information to be stored on magnetic tape as it moves across the support surface. In contrast, a reproducing element detects a magnetic field from the surface of magnetic tape as the tape moves over the support surface.

Normally there is some microscopic separation between the transducer and magnetic tape during operation that reduces the strength of the magnetic field coupled to the tape surface during the recording process. During the reproducing process, the separation reduces the coupling between the tape field and the reproducing element. This reduction in magnetic field strength is know as "spacing loss".

Magnetic field strength detected by a tape or by a reproducing element is proportional to $e^{-kd/\lambda}$, where d is the head-to-tape separation, $\lambda$ is the recording wavelength, and k is a constant. As is apparent, detected magnetic field strength decreases exponentially both with respect to separation between the tape and the raised support surface of an island and with respect to recording density (which is inversely related to the recording wavelength). Thus, while a limited amount of head-to-tape separation might be acceptable at low recording densities (10–20 KFCI), smaller transducers used with magnetic tapes of higher recording densities (40–80 KFCI) can tolerate substantially no head-to-tape separation. Accordingly, there is an important need for coordinated wear between raised support surfaces and transducer surface regions of magnetic tape heads to keep head-to-tape separation within acceptable tolerances.

When uniform tension is applied to a recording tape as the tape passes at a wrap angle on the raised support surface of an island having a uniform height and a uniform width, the tape exerts a pressure against the raised support surface of the island that is uniform along the longitudinal axis of the island. And this uniform pressure is essentially proportional to the tension and the wrap angle and inversely proportional to the island width.

Tape pressure against the raised support surface of an island can be modified. For example, the pressure can be changed by modifying the tension in the tape, by modifying the wrap angle of the tape on the support surface of the island, or by modifying the width of the raised support surface of the island. Accordingly, pressure on the surface of an island can be increased by increasing the tension in the tape, by increasing the wrap angle of the tape on the support surface of the island, or by decreasing the width of the support surface. In this regard, increased pressure reduces "spacing loss".

But increased pressure has negative consequences. For example, increased pressure reduces tape life and increases the possibility of tape damage and data loss. Also, increased pressure causes islands to wear down more quickly. And this accelerated island wear results in shortened head life. Moreover, increased pressure can result in uneven wear along raised support surfaces. Uneven wear can be particularly bothersome between regions of an island with a transducer and regions of an island without a transducer. This uneven wear can also result in shortened head life and can contribute to "spacing loss".

In practice, tape support islands and cores can be made of a variety of materials, each with own manufacturing advantages. However, the best wear matching is achieved when they are made from the same material, hence the manufacturing advantage such as lower cost, are lost. The problem of using various material is during normal operation and under the same pressure, these various materials wear at different rates. In order to use different material, a very difficult and time consuming method is required in order to select compatible material. Hence, only a limited number of composite structures are used and often results in uneven support surface profiles, large "spacing loss", and bad performance.

SUMMARY OF THE INVENTION

An object of the invention is a magnetic head that has longer life.

Another object of the invention is a magnetic head that provides minimized "spacing loss" over the life of the head.

yet another object of the invention is a magnetic head with a wear surface arrangement that allows the use of a large selection of different materials together for predetermined self-adjusting wear.

Still another object of the invention is an improved method of manufacturing a magnetic head.

These and other objects are attained by a magnetic tape head having a particular type of raised tape support or wear surface arrangement. In a broad sense, the magnetic tape head according to the principles of the invention includes a member having two spaced apart generally coplanar raised support or wear surfaces on one side of the member. The raised wear surfaces are generally aligned along an axis in spaced apart relationship. The axial spaced apart relationship of the raised wear surfaces form a space between their opposing ends. Nonmagnetic material is located in the space and joins the opposing ends of the raised wear surfaces. A transducer including a magnetic core is embedded in the nonmagnetic material. The magnetic core has a side with an elongated surface of uniform width. Further, the elongated surface of the magnetic core extends in a direction transverse to the raised elongated wear surfaces. The elongated surface of the magnetic core and the surface of the nonmagnetic material together form a composite wear surface that is generally coplanar with the raised wear surfaces. The area of the elongated surface of the magnetic core and the area surface of the nonmagnetic material are so proportioned that the wear of the composite wear surface is controlled by the nonmagnetic material. And the hardness of the nonmagnetic material and the dimension of the composite wear surface extending transversely of the raised wear surfaces are selected to effect a predetermined wear between the composite wear surface and the raised wear surfaces as a result of magnetic tape being advanced across them.

In a more specific sense, the above and other objects are attained by a tape head that includes a member of magnetic ferrite material formed with a discontinuous island on one side. The island has a top surface that provides two spaced apart generally coplanar raised elongated wear surfaces. These raised elongated wear surfaces are generally aligned along the longitudinal axis of the island in spaced apart relationship. And the axial spaced apart relation ship of the raised elongated wear surfaces form a spacebetween their facing ends. Glass fills the space between the facing ends of the raised elongated wear surfaces. A core made of magnetic ferrite material is embedded in the glass. One side of the core has an elongated surface of uniform width with a gap extending transversely across its entire width. The elongated surface of the magnetic ferrite core extends in a direction normal to the longitudinal axis of the island. The elongated surface of the core and the surface of the glass together forming an elongated composite wear surface that is generally coplanar with the raised elongated wear surfaces and that has a length greater than the width of the raised elongated wear surfaces. The area of the elongated surface of the magnetic ferrite and the surface area of the glass are so proportioned that the wear of the composite wear surface is controlled by the glass. The hardness of the glass and the lengthwise dimension of the composite wear surface and the raised elongated wear surfaces from magnetic tape being advanced across them.

In a manufacturing sense, the above and other objects are attained by a method of manufacturing a magnetic head that includes forming a raised wear surface on one side of a member, and forming a notch in the member that divides the raised wear surface into two spaced apart coplanar raised wear surfaces that are aligned on an axis and that are spaced apart by the space of the notch. A transducer is place in the notch with an elongated surface of uniform width extending transverse of the axis. A body of nonmagnetic material is formed at the notch space that surrounds the transducer. A composite wear surface of the elongated surface of the transducer and the nonmagnetic material at the space of the notch. The composite wear surface is generally coplanar with the spaced apart raised wear surfaces. The composite wear surface is fabricated with the area of the elongated surface of the transducer and the surface area of the nonmagnetic being so proportioned that the wear of the composite wear surface is controlled by the nonmagnetic material. And the dimension of the composite wear surface extending transverse of the axis is determined from the hardness of the nonmagnetic material to effect a predetermined wear between the composite wear surface and the spaced apart raised wear surface.

Other objects, features, and advantages of the invention will become apparent as the invention is described in more detail with reference made to the accompanying drawings.

DESCRIPTION OF THE PREFERRED EMBODIMENTS

Figure 1:
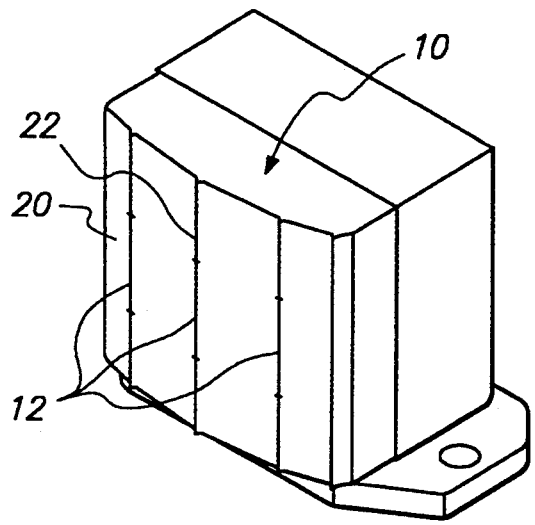
FIG. 1 is an isometric view of a magnetic tape head according to the principles of the invention.
Figure 2:
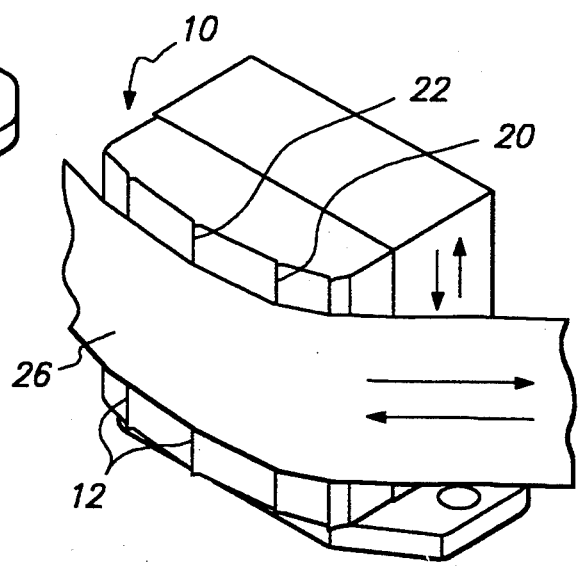
FIG. 2 is an isometric view of the magnetic tape head shown in FIG. 1 further showing a magnetic tape being advanced across it.

FIG. 1 shows a magnetic tape head of magnetic ferrite material. Ridges or islands 12 of magnetic ferrite material are formed on one side of the head 10. Each of the islands 12 includes two wide composite wear regions, which each includes a magnetic write transducer 20 or a mangetic read transducer 22. FIG. 2 shows the same magnetic tape head 10 with magnetic tape 26 being advanced across it. The arrows show the reversible directions of tape motion. Arrows also indicate an arrangement that moves the tape head 10 back and forth (up and down as viewed in FIG. 2) across the tape 26 transversely of tape advancement. Accordingly, as viewed in FIG. 2 the tape 26 may move in a forward or backward direction. And the head 10 may be positioned upwardly or downwardly to align the read and write transducers to read or write information along different data tracks arranged longitudinally on the tape 26.

As shown in FIGS. 1 and 2, each island 12 provides an elongated wear surface that includes two transducers, which may be either reproducing (reading) elements 22 or recording (writing) elements 20. Each of the writing transducers 20 forms a magnetic field in the vicinity of a narrow gap in the tape support surface of its associated island 12. Each of the reproducing elements 22 detects a magnetic field from the surface of the magnetic tape 26.

Figure 3:
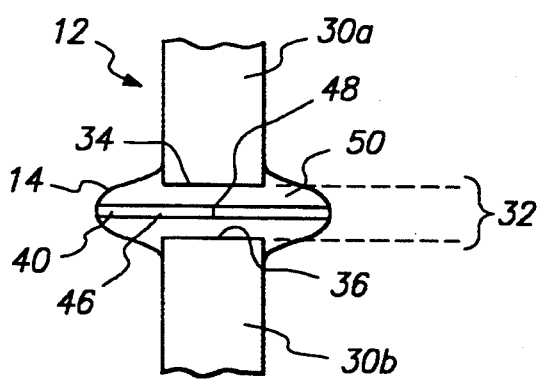
FIG. 3 is an enlarged plan view of a region of an island including two aligned spaced apart raised island wear surfaces and a composite wear surface that includes glass and an elongated surface of the magnetic core of a transducer. The elongated surface of the core includes a gap.
Figure 4:
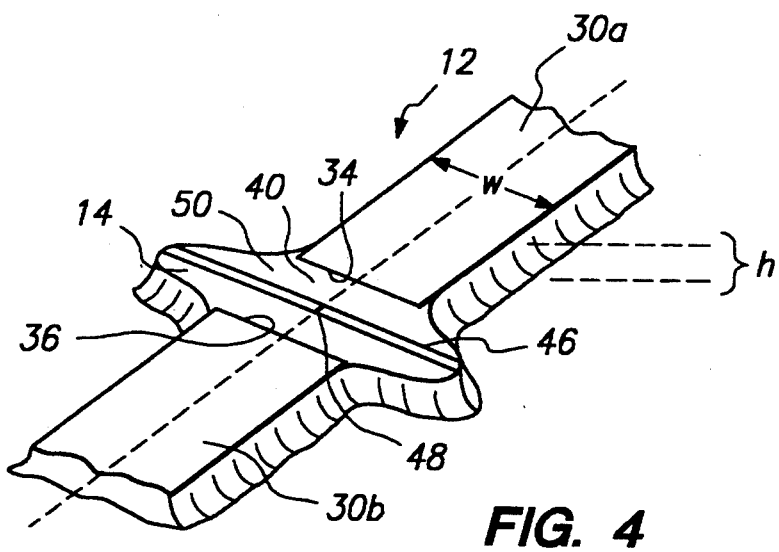
FIG. 4 is an enlarged isometric view of the region of the island shown in FIG. 3.

FIGS. 3 and 4 show an island region having a composite wear surface 14 that is wider than the width of the island 12. As shown, the island 12 is discontinuous to provide two coplanar raised elongated wear surfaces 30a and 30b that each have a uniform height "h" and a uniform width "w". The surfaces 30a and 30b are curved or somewhat rounded and aligned along the longitudinal axis "A" of the island 12, which is indicated in dashed lines. Further, because the island 12 is discontinuous, the surfaces 30a and 30b are in axial, or end-to-end, spaced apart relationship that forms a space 32 between their ends 34 and 36. As shown, the ends 34 and 36 extend parallel to each other.

Nonmagnetic material in the form of a body of high hardness or wear bearing glass 40 is shown to fill completely the space 32 between the ends 34 and 36. The glass extends beyond the width of the island 12.

Figure 12:
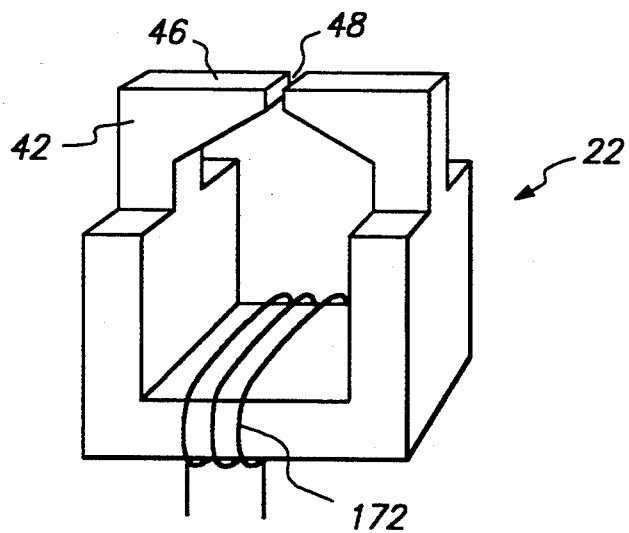
FIG. 12 is a simplified representation of a transducer having a magnetic ferrite core. The transducer is used to form the composite wear surface shown in connection with the embodiment shown in FIGS. 1–4.

Embedded in the glass 40 is a reproducing element transducer 22 (see FIG. 12) including a magnetic ferrite core 42 (see FIG. 12). It is noted here that the use of a reproducing element transducer is for description purposes only. The invention is equally applicable to a recording element transducer. One side of the magnetic ferrite core 42 has an elongated surface 46 of uniform width along its length. And the surface 46 has a gap 48 extending across its entire width. The surface 46 extends transversely of the elongated wear surfaces 30a and 30b (and thus the island 12) in its preferred orientation normal to the longitudinal axis of the island 12. As shown, the gap 48 extends perpendicular to the ends 34 and 36 (and, hence, perpendicular to the longitudinal axis of the elongated surface 46). Further, as shown, the length of the elongated surface 46 is greater than the width of the island 12 wear surfaces 30a and 30b).

The elongated surface 46 and the surface 50 of the body of glass 40 together form the composite wear surface 14, which is generally coplanar with the raised elongated wear surfaces 30a and 30b. And, as shown, the composite wear surface 14 is elongated with its length being greater than the width of the island 12. Further, the length of the composite wear surface 14, as shown, is the same length as the length of the elongated surface 46.

The relationship between the areas of the elongated surface 46 and the surface 50 is important: the area of the glass surface 50 must be sufficiently large with respect to the elongated surface 46 that from a wear standpoint the glass surface 50 is dominant. That is, the area of the elongated surface 46 of the core 42 and the area of the surface 50 of the glass 40 are so proportioned that the wear of the composite wear surface 14 is determined or controlled by the glass surface 50. In other words, the area of the surface 46 of the core 42 is so small with respect to the area of the surface 50 of the glass 40 that the surface 46 is insignificant in determining the wear of the composite wear surface 14.

In practice, the ratio or proportion is generally in the range of about 10 to 1 or more. That is, the surface area of a composite wear surface, such as surface 14, is about 10 times or so greater than the area of the elongated surface of a core or transducer, such as the surface 46. In practice, for arrangements like that shown in FIGS. 1–4, the width of the elongated surface 46 and the distance between the ends 34 and 36 are used. For example, if the width of the surface were 2 milli inches, the distance between the ends 34 and 36 would be around 20 milli inches. Of course, the with of the elongated surface 46 is affected by such things as tape recording track width.

Both the hardness of the glass and the dimension of the composite wear surface 14 extending transversely of the raised elongated wear surfaces 30a and 30b are selected to effect a predetermined wear between the composite wear surface 14 and the raised wear surfaces 30a and 30b as a result of magnetic tape being advanced across them. In the embodiment shown in FIGS. 1-4 the glass has a hardness of around $\frac{2}{3}$ of the hardness of the ferrite forming the raised elongated surfaces 30a and 30b.

Because the hardness of the body of glass 40 is normally less than the hardness of the ferrite used to form raised wear surfaces 30a and 30b, the composite wear surface 14 must be designed wider than the raised elongated wear surfaces 30a and 30b to reduce the tape pressure per unit area on the surface 14. Its wideness is determined so as to match the wear rates between the composite wear surface 14 and the raised elongated wear surfaces 30a and 30b.

Initially, the wear surfaces 30a and 30b, and the composite wear surface 14, having the area and hardness relationships specified, are at the same elevation or height. But during advancement of tape across these wear surfaces, the pressure (force per unit area) of tape on the wider region of the composite wear surface 14 is less than the pressure of tape on the narrower surfaces 30a and 30b. As a result, the friction force per unit area in the wider region of the composite wear surface 14 is less than the friction force per unit area in the narrower regions of surfaces 30a and 30b.

An explanation of the general wear of an island arrangement having a wide region and narrower regions is explained in U.S. Pat. No. 5,055,959, which is hereby specifically incorporated by reference.

With the wear surface arrangement shown in the embodiment of FIGS. 1-4, the surfaces 30a and 30b initially tend to wear more rapidly than the composite wear surface 14, until the wider surface 14 approaches a raised height with respect to the surfaces 30a and 30b. As the composite wear surface 14 becomes raised in relation to the surfaces 30a and 30b, tape pressure on the surface 14 increases. At some point the pressure across surfaces 30a and 30b, and across composite wear surface 14 becomes generally uniform. Consequently, the wear across these surfaces becomes generally uniform. And the wear surfaces continue to maintain a nonuniform height as they wear down in a uniformly in a self-adjusting manner with the composite wear surface 14 being slightly higher than the raised elongated wear surfaces 30a and 30b. In practice, composite wear surfaces are designed to maintain a height difference between the composite wear surface and raised elongated wear surfaces of, in general terms, about 50 micro inches.

The process of wear is self-adjusting for the life of the head 10. If the composite wear surface becomes too high or low with respect to the height of the elongated wear surfaces 30a and 30b, the rate of wear will accordingly increase or decrease. When the height profile has returned to its desired configuration, tape pressure (force per unit area) becomes substantially uniform at the composite wear surface 14 and the elongated wear surfaces 30a and 30b.

Because the wider composite wear surface 14 containing the transducer 22 becomes raised with respect to the raised wear surfaces 30a and 30b during use, spacing between the transducer 22 and magnetic tape is reduced throughout head life.

Figure 3A:
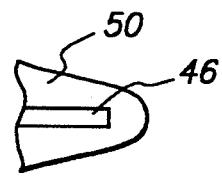
FIG. 3a is a simplified illustration of a modification to the end of the composite wear surface to reduce the wear rate of the elongated surface of the magnetic core shown in FIG. 3.

During use the elongated surface 46 will tend to become slightly higher than the surrounding surface 50 of the body of glass 40. This slight height difference, due to the difference in hardness between the ferrite forming the surface 46 and the hardness of the glass 40 forming the surface 50, has an effect on reducing "spacing loss". The extent of height difference can be controlled to somewhat by the geometry of the composite wear surface 14. For example, if the glass 40 of the composite wear surface 14 is made wider in an area beyond the ends of the surface 46 and aligned with the surface 46 as indicated in FIG. 3a, the tape pressure per unit area on the surface 46 will be reduced somewhat. And the difference in height will be increased somewhat.

In practice, the width of the elongated magnetic support surface 46 (gap 48) is a width effective to accomplish tape track width requirements. For conventional recording, gap width is from about ½ track width to a width equal to, or slightly smaller than track width. For azimuth recording, gap width is from generally equal to track width to about twice track width. In the embodiment of FIGS. 1-4, the transverse width of the gap 48 (and the elongated magnetic support surface 46) is typically from 1-2 milli inches.

While the island 12 is as shown as made of magnetic ferrite, it can be formed of other types of magnetic material, or can be formed of nonmagnetic material. For example, the island 12 could be made of magnetic material, such as manganese zinc or nickel zinc. Moreover, it could be made of nonmagnetic material such as calcium titenate, barium titenate, or alsimag. The selection of the material, whether magnetic or nonmagnetic, is generally done to meet specific tape composition and desired head life.

The composite wear surface is designed (proportioned) to accomplish self regulating properties by selecting the material and the area by proper selection of the dimension of the surface extending transversely of the raised support surfaces like surfaces 30a and 30b. In some instances where the hardness of the nonmagnetic material, such as glass (or other appropriate nonmagnetic material), holding a core or transducer in place, a composite wear surface may be smaller in width than the width of raised support surfaces.

While the nonmagnetic material 40 is glass in the embodiment shown in FIGS. 1-4, other nonmagnetic material can be used. For example, calcium titenate, nonmagnetic ferrite, or barium titenate might be used. And, of course, different glasses of different hardness can be used. Moreover, nonmagnetic material could be composite material itself. In this regard, a composite material might be glass and nonmagnetic ceramic in various proportions to give desired wear characteristics.

Figure 5:
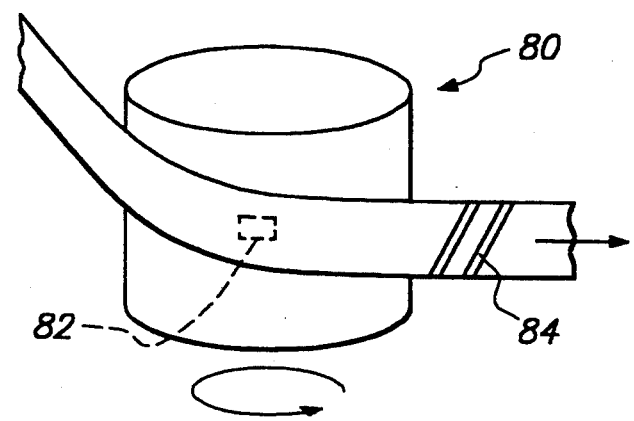
FIG. 5 is a simplified showing of a rotating magnetic tape head arrangement.

It is also noted that, while the raised wear surfaces 30a and 30b are shown as aligned along their longitudinal axes (which are coincident with the longitudinal axis of the island 12) in FIGS. 1-4, the concept of the invention includes raised wear surfaces that are out of alignment and that have different widths. Also, it is noted that it may be advantageous in some circumstances to have raised wear surfaces, like surfaces 30a and 30b, that are not necessarily elongated and the gap is tilted with the desired Azmith Angle. Such an arrangement could be especially useful in rotating magnetic tape head arrangement where information is recorded in helical form on a magnetic tape. In this regard, see FIG. 5 for a simplified showing of a rotating magnetic head 80. As shown, the tape head 80 includes a transducer with raised wear surfaces and composite wear surface arrangement indicated in dashed lines and identified by the reference numeral 82. Also shown is a tape 84 being advanced in the direction of the arrow across the head 80. The reference numeral 84 indicates helical tracks.

Figure 6:
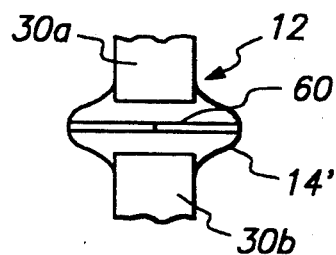
FIG. 6 is an enlarged plan view of another embodiment of a composite wear surface configuration according to the principles of the invention that uses a magnetoresistive element.
Figure 7:
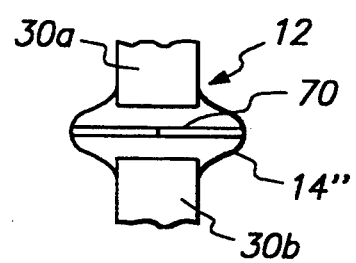
FIG. 7 is an enlarged plan view of yet another embodiment of a composite wear surface configuration according to the principles of the invention that used a thin film element.

While the embodiment disclosed in connection with FIGS. 1-4 includes a transducer using a ferrite core inductive head, the invention contemplates the use of other suitable transducers, for example transducers using magnetoresistive elements and transducers using thin film heads. In this regard, see FIGS. 6 and 7. FIG. 6 is simplified showing of a region of a magnetic tape head using a wear surface arrangement like the arrangement of FIGS. 1-4 with raised elongated support surfaces 30a and 30b. But the embodiment of FIG. 6 uses a modified composite wear surface 14' that employs an elongated core surface using a magnetoresistive element 60. And the embodiment of FIG. 7 uses a modified composite wear surface 14" that employs an elongated core surface using a thin film element 70.

Moreover, while the invention has been disclosed in connection with a magnetic tape head, the invention includes magnetic heads for use with any contact recording media, for example floppy or hard magnetic disks.

Figure 8:
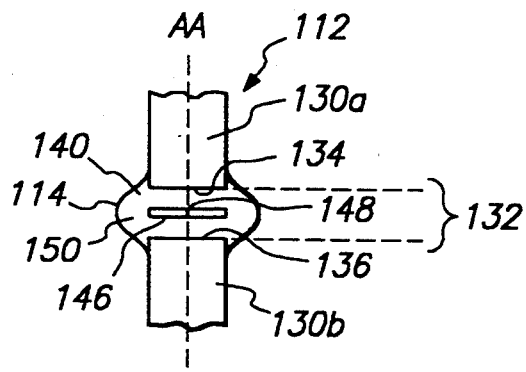
FIG. 8 is an enlarged plan view of another embodiment of a composite wear surface configuration according to the principles of the invention.
Figure 9:
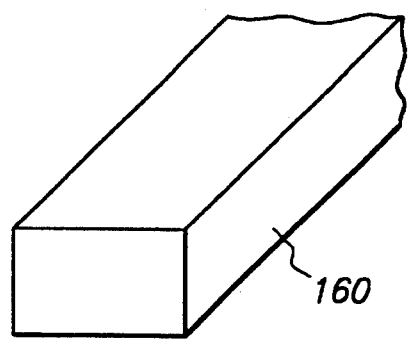
FIG. 9 is a showing of a magnetic ferrite member used to shape one of the support surface arrangements of the magnetic tape head illustrated in FIGS. 1–4.

Referring to FIG. 8, there is shown another embodiment of a region of an island arrangement of a magnetic tape head, including a composite wear surface, in accordance with the instant invention. FIG. 8 shows an island 112 that is discontinuous to provide two spaced apart coplanar raised elongated wear surfaces 130a and 130b of uniform height and width along their length. And, like elongated wear surfaces 30a and 30b, surfaces 130a and 130b are aligned along the longitudinal axis AA of the island 112, which is indicated by dashed lines. Because of axial, or end-to-end, spaced apart relationship of the raised elongated wear surfaces 130a and 130b, the ends 134 and 136 form a space 132 between them. And as shown, the ends 134 and 136 extend parallel to each other.

Nonmagnetic material in the form of a body of high hardness or wear bearing glass 140 completely fills the space 132. And like the body of glass 40, the body of glass 140 extends beyond the width of the island 112.

Embedded in the glass 140 is a transducer including a magnetic ferrite core. One side of the magnetic core has an elongated surface 146 of uniform width along its length. The surface 146 has a gap 148 extending transversely across its entire width normal to the longitudinal axis of the surface 146. The elongated surface 146 is shown to be extending transverse to the raised elongated wear surfaces 130a and 130b at right a angle with the longitudinal axis of the island 112.

Unlike the elongated magnetic surface 46 of the core 42, the length of the elongated surface 146 is substantially the same width as the surfaces 130a and 130b.

The width of the surface 146 is determined by the same consideration as the considerations that go into determining the width of the surface 46.

The area of the elongate surface 146 and the area of the surface 150 of the glass 140 are proportioned so that the wear of the composite wear surface 114 is determined or controlled by the glass 140. That is, the area of the surface 146 is small with respect to the area of the surface 150 of the glass 140 that the surface 146 insignificant in determining the wear of the composite surface 114.

As with the embodiment shown in FIGS. 1-4, the hardness of the glass 140 and the dimension of the composite wear surface 114 extending transversely of the raised elongated wear surfaces 130a and 130b are selected to accomplish self-regulating wear between the composite wear surface 114 and the raised wear surfaces 130a and 130b.

Referring now to FIGS. 9-13, there are illustrated various steps in the process of manufacturing the island tape support or wear surface arrangement shown in the magnetic tape head embodiment of FIGS. 1-4. In this regard and referring more specifically to FIG. 9, a section of a member 160 of magnetic ferrite material is shown from which is formed a region of the island 12 including two aligned spaced apart raised island wear surfaces 30a and 30b and the composite wear surface 14.

Figure 10:
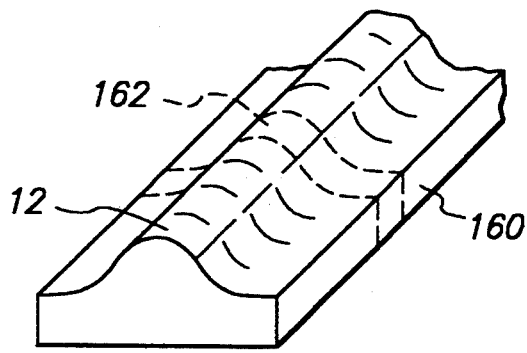
FIG. 10 is a showing of the magnetic ferrite member in FIG. 9 after it has been shaped with an island but before it has been notched.

FIG. 10 shows the member 160 formed by conventional contour grinding to have a continuous island 12 with a raised elongated wear surface prior to forming a notch in the member 160 to effect a discontinuous island 12. The location of a notch 162 to be formed is indicated by dashed lines in FIG. 10.

Figure 11:
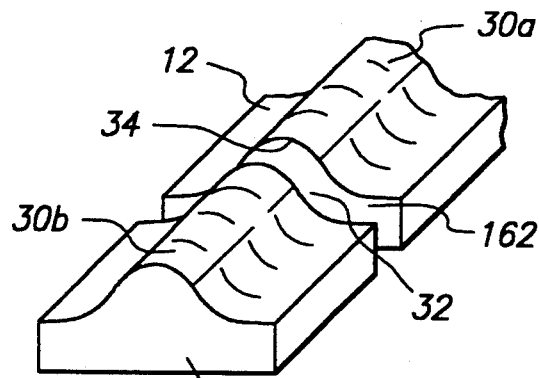
FIG. 11 is a showing of the shaped magnetic ferrite member of FIG. 10 that has been notched to have a space for construction of a composite wear surface.

FIG. 11 illustrates the member 160 after the notch 162 has been made normal to the longitudinal axis of the island 12. At this stage the island 12 is divided to form the spaced apart raised wear surfaces 30a and 30b with the notch space 32 between the ends 34 and 36. The step of notching the bar 160 can be accomplished by known means, such as conventional disk type slotting. At this stage in the process the space formed by the notch 162 is empty.

FIG. 12 is a simplified representation of an encoding element transducer 22 including the core 42 and a coil 172. FIG. 10 shows the elongated surface 46 of the core 42 and the gap 48.

Figure 13:
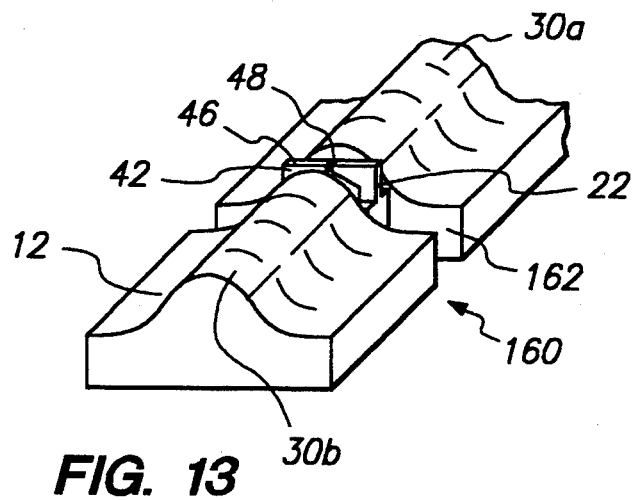
FIG. 13 shows the transducer of FIG. 12, which includes the magnetic ferrite core, in position in the notch space of the shaped and notched ferrite member in FIG. 11. The showing in FIG. 13 is prior to securing the transducer in glass in forming a composite wear surface.

FIG. 13 depicts the transducer 22 in place in the notch 162 before the body of glass 40 is introduced at the notch 162 to embed the transducer 22 and form the composite wear surface 14. The wear surface 14 can be finished by polished lapping using diamond lapping tape.

FIGS. 3 and 4 illustrate the completed tape support or wear region made by the process illustrated by FIGS. 6-11.

In summary then, a member preformed with an island and notched to predetermined size prior to placement and securement of a transducer (magnetic core) in the notch space. Then a transducer with a magnetic core of desired width and length is secured in position with nonmagnetic material, such as glass.

Figure 14:
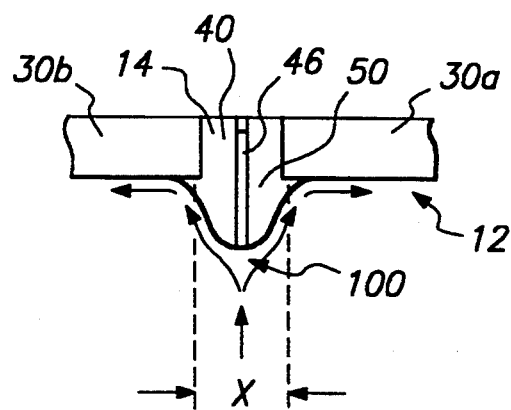
FIG. 14 is a plan view of a portion of the wear surface region including a composite wear surface depicted in FIGS. 3 and 4.

Referring now to FIG. 14, there is shown a plan view of a portion of the region the magnetic head depicted in FIGS. 3 and 4 to illustrate an aerodynamic advantage to wide wear regions having tapering toward their end regions, as is the situation with the composite wear surface 14 and the structure forming it. As can be seen from arrows in FIG. 14, air flow (shown by the arrows) from tape movement divides as a result of coming into contact with the end region of the structure forming the composite wear surface 14. The divided air is directed by the wide wear region to move lengthwise of the island 12. And this division and direction of air flow promotes a tighter head-to-tape relationship (reduced "spacing loss") because of the reduced tendency of air to force itself between a moving tape and wear surfaces, especially in the region of the composite wear surface 14. The composite wear surface 14 tends to be somewhat higher than surrounding wear surfaces. It has been determined that the dimension of a wider wear region extending lengthwise of an island (indicated by the dimension X in FIG. 14) should not be much greater than the width of an island, and preferably less than island width.

It is apparent that within the scope of the invention modifications and different arrangements may be made other than as herein disclosed. The present disclosure is merely illustrative, the invention comprehending all variations thereof.

I claim:

1. A magnetic head for use with contact recording media comprising:
   a member of a first material;
   two spaced apart generally coplanar raised wear surfaces generally aligned along an axis;
   nonmagnetic material different from said first material in a space between the two raised wear surfaces; and a transducer embedded in the nonmagnetic material, such transducer having an elongated surface of uniform width on one side, the elongated surface of the transducer extending in a direction transverse to said axis, the elongated surface of the transducer and the surface of the nonmagnetic material together forming a composite wear surface that is generally coplanar with the raised wear surfaces and extends in said traverse direction a distance greater than the raised wear surfaces extend, the surface area of the nonmagnetic material being larger than the area of the elongated surface of the magnetic transducer so that the wear of the composite wear surface is controlled by the nonmagnetic material, the hardness of the composite wear surface providing a predetermined wear between the composite wear surface and magnetic contact recording media and between the raised elongated wear surfaces and magnetic contact recording media being advanced across them.

2. The magnetic head of claim 1 wherein the transducer includes a magnetoresistive element.

3. The magnetic head of claim 1 wherein the transducer includes a thin film element.

4. The magnetic head of claim 1 wherein the coplanar wear surfaces are elongated.

5. The magnetic head of claim 1 wherein the coplanar wear surfaces are curved.

6. A magnetic tape head comprising:
   a member of a first material;
   two spaced apart generally coplanar raised wear surfaces on one side of the member, the wear surfaces being generally aligned along their longitudinal axis;

nonmagnetic material different from said first material in a space between the facing ends of the raised elongated wear surfaces; and a magnetic core embedded in the nonmagnetic material, such core having on one side an elongated surface of uniform width with a gap extending across its entire width, the elongated surface of the core extending in a direction transverse to said axis the elongated surface of the core and the surface of the nonmagnetic material together forming a composite wear surface that is generally coplanar with the raised elongated wear surfaces and extends in said traverse direction a distance greater than the raised wear surfaces extend, the surface area of the nonmagnetic material being larger than the area of the elongated surface of the magnetic core so that the wear of the composite wear surface is controlled by the nonmagnetic material, the hardness of the nonmagnetic material and the dimension of the composite wear surface extending transversely of the raised elongated wear surfaces providing a predetermined wear between the composite wear surface and magnetic tape and between the raised elongated wear surfaces and magnetic tape being advanced across them.

7. The magnetic tape head of claim 6 where the composite wear surface extends beyond the width of the raised elongated wear surfaces.

8. The magnetic tape head of claim 6 where the raised elongated wear surfaces are formed of magnetic material.

9. The magnetic tape head of claim 8 where the magnetic material is ferrite.

10. The magnetic tape head of claim 8 where the nonmagnetic material is glass.

11. The magnetic head of claim 1 wherein the nonmagnetic material is glass.

12. The magnetic head of claim 11 wherein the area of the elongated surface of the glass is about 10 times or more larger than the area of the elongated surface of the magnetic transducer.

* * * * *